US008225223B2

(12) United States Patent
Becerra, Jr.

(10) Patent No.: US 8,225,223 B2
(45) Date of Patent: *Jul. 17, 2012

(54) METHOD AND SYSTEM FOR CREATING GRAPHICAL AND INTERACTIVE REPRESENTATIONS OF INPUT AND OUTPUT DATA

(75) Inventor: Santiago E. Becerra, Jr., Del Mar, CA (US)

(73) Assignee: SAP America, Inc., Palo Alto, CA (US)

( * ) Notice: Subject to any disclaimer, the term of this patent is extended or adjusted under 35 U.S.C. 154(b) by 193 days.

This patent is subject to a terminal disclaimer.

(21) Appl. No.: 12/690,034

(22) Filed: Jan. 19, 2010

(65) Prior Publication Data
US 2010/0180220 A1  Jul. 15, 2010

Related U.S. Application Data

(63) Continuation of application No. 10/153,400, filed on May 21, 2002, now Pat. No. 7,650,576.

(60) Provisional application No. 60/363,382, filed on Mar. 7, 2002.

(51) Int. Cl.
*G06F 3/00* (2006.01)

(52) U.S. Cl. ........ 715/764; 715/783; 715/789; 715/771; 715/732; 715/737

(58) Field of Classification Search ................. 715/783, 715/789, 771, 732, 737
See application file for complete search history.

(56) References Cited

U.S. PATENT DOCUMENTS

| | | | |
|---|---|---|---|
| 5,381,523 A | 1/1995 | Hayashi | |
| 5,386,568 A | 1/1995 | Wold et al. | |
| 5,553,211 A | 9/1996 | Uotani | |
| 5,619,631 A | 4/1997 | Schott | |
| 5,640,557 A | 6/1997 | McKiel, Jr. | |
| 5,721,848 A | 2/1998 | Joseph | |
| 5,727,161 A | 3/1998 | Purcell, Jr. | |
| 5,930,514 A | 7/1999 | Thompson et al. | |
| 5,999,729 A | 12/1999 | Tabloski et al. | |
| 6,011,553 A | 1/2000 | Komiyama | |
| 6,088,030 A | 7/2000 | Bertram et al. | |
| 6,154,875 A | 11/2000 | Tanaka et al. | |
| 6,181,342 B1 | 1/2001 | Niblack | |
| 6,236,406 B1 | 5/2001 | Li | |
| 6,266,716 B1 | 7/2001 | Wilson et al. | |
| 6,272,672 B1 | 8/2001 | Conway | |

(Continued)

OTHER PUBLICATIONS

W3C, Web Services Glossary, pp. 1-25 (Feb. 11, 2004) (downloaded Apr. 21, 2009) http://www.23.org/TR/ws-gloss/.

*Primary Examiner* — William Bashore
*Assistant Examiner* — Mylinh Tran
(74) *Attorney, Agent, or Firm* — Mintz, Levin, Cohn, Ferris, Glovsky and Popeo, P.C.

(57) ABSTRACT

The invention relates to a method and tool which allows users to create interactive representations of input and output data, and simulate the associated algorithms used to manipulate this data, that are used in spreadsheet applications and other similar software programs. The interactive simulation is visually represented by a customizable set of components which hereinafter will be referred to as a control pane. The control panels can consist of a variety of components which include user interface elements (such as sliders, buttons, and checkboxes), charts and maps. The underlying simulation is generated based on data sources within an application software program file (e.g., spreadsheet data cells) selected by the user during the control panel creation process.

20 Claims, 5 Drawing Sheets

U.S. PATENT DOCUMENTS

| | | |
|---|---|---|
| 6,331,864 B1 | 12/2001 | Coco et al. |
| 6,430,730 B1 | 8/2002 | Ghatate et al. |
| 6,449,643 B1 | 9/2002 | Hyndman et al. |
| 6,560,528 B1 | 5/2003 | Gitlin et al. |
| 6,684,190 B1 | 1/2004 | Powers et al. |
| 6,904,408 B1 | 6/2005 | McCarthy et al. |
| 6,993,504 B1 | 1/2006 | Friesen et al. |
| 7,047,092 B2 | 5/2006 | Wimsatt |
| 7,093,005 B2 | 8/2006 | Patterson |
| 7,421,648 B1 | 9/2008 | Davis |
| 7,512,906 B1 | 3/2009 | Baier et al. |
| 7,650,355 B1 | 1/2010 | Davis |
| 7,720,953 B2 | 5/2010 | Mateescu et al. |
| 2002/0084974 A1 | 7/2002 | Ohshima et al. |
| 2002/0184610 A1 | 12/2002 | Chong et al. |
| 2003/0018661 A1 | 1/2003 | Darugar |
| 2003/0154279 A1 | 8/2003 | Aziz |
| 2003/0158947 A1 | 8/2003 | Bloch et al. |
| 2003/0167265 A1* | 9/2003 | Corynen ........................... 707/4 |
| 2004/0207659 A1 | 10/2004 | Goodman et al. |
| 2004/0260427 A1 | 12/2004 | Wimsatt |
| 2005/0014494 A1 | 1/2005 | Owen et al. |
| 2005/0289137 A1 | 12/2005 | Wu et al. |
| 2006/0004771 A1 | 1/2006 | Enenkiel et al. |
| 2006/0187048 A1* | 8/2006 | Curkendall et al. ....... 340/572.4 |
| 2006/0236254 A1 | 10/2006 | Mateescu et al. |
| 2007/0002689 A1 | 1/2007 | Mateescu et al. |
| 2007/0180447 A1 | 8/2007 | Mazzaferri et al. |
| 2007/0239573 A1 | 10/2007 | Tien et al. |
| 2009/0248524 A1 | 10/2009 | Defoy et al. |

\* cited by examiner

METHOD AND SYSTEM FOR CREATING GRAPHICAL AND INTERACTIVE REPRESENTATIONS OF INPUT AND OUTPUT DATA

CROSS REFERENCE TO RELATED APPLICATIONS

This application is a continuation of U.S. patent application Ser. No. 10/153,400 filed May 21, 2002 now U.S. Pat. No. 7,650,576 which claims priority to U.S. Provisional Patent Application No. 60/363,382 filed Mar. 7, 2002, entitled "Method and Tool for Creating Graphical and Interactive Representations of Input and Output Data," the entirety of which is incorporated herein by reference.

BACKGROUND OF THE INVENTION

The present invention relates to the field of computer graphics and, more particularly, to a method and system for creating custom computer graphic representations of input and output data.

DESCRIPTION OF RELATED ART

Business application software available today, such as Microsoft Excel® spreadsheet software, for example, provides limited functionality in creating graphic representations of input and output data such as data contained in the cells oaf spreadsheet, for example. These programs allow users to assign standard bar graphs and/or pie charts, for example, which are provided as part of the software package. Typically, the range of creativity in generating these graphics is limited to selecting graphic components that are contained or made available in the software application programs themselves. Additionally, the graphic representations of the input and output data, once they are created, must reside as part of the underlying business application software. In other words, it cannot be exported as a stand-alone piece of software that may be executed and manipulated independently of the underlying business application software.

There currently exists a great divide between computer graphic/animation features offered in the context of business application software programs and that offered in the context of other software environments such as video games or web pages on the world wide web (i.e., the Internet), for example. In these latter environments, the advancement of computer graphic and animation techniques has led to visually exciting and stimulating product offerings to consumers. As is readily observable by simply "surfing the net," or visiting a video game store or arcade, the advancements in computer graphic and animation technology to date has been remarkable.

Various software packages or techniques for creating computer graphics and animations for web pages and/or video games are known in the art. For example, Macromedia Inc.'s Flash™ program is well known and widely used today to create computer graphics and animations for web pages. Flash™ enables users to generate computer graphics and animations in the form of compressed audio and video files (.swf files) which can be executed by a Flash Player™ program. Flash Player™ is a well-known program that is executable as a standalone application or as a Plug-in program that is available on a variety of platforms for a variety of Web Browsers.

To date, no method or system allows every day users of business application software programs to utilize advanced external computer graphic and animation software (e.g., Flash™) to create dynamic, interactive and content-rich computer graphics and animations to represent data in their business software applications. Thus, there is a need for a method and system that allows users to associate externally-created graphics and/or animations (collectively referred to herein as "graphics") with input and output data of business application software programs, so as to create a dynamic and interactive graphic representation of the input and output data. There is a further need for a method and system that allows users to associate externally-created graphics with input and output data oaf business application software program so as to create a dynamic and interactive computer graphics file representative of the input and output data, wherein the computer graphics file may be executed by a standalone program that is independent of the business application software program.

SUMMARY OF THE INVENTION

The invention addresses the above and other needs by providing a method and system for allowing users to create dynamic and interactive graphics representative of input and output data, wherein the dynamic characteristics of the graphics behave in accordance with associated algorithms that govern the relationships between the input and output data. It is readily apparent to those of ordinary skill in the art that the method and system of the present invention may be implemented using conventional personal computers having conventional components therein (e.g., CPU, hard drive, RAM, keyboard, monitor, graphics processor, etc.), and which are commercially available today.

In one embodiment of the invention, the method includes generating a "control panel" (explained in further detail below) by creating and/or selecting graphic components or objects and placing them on a graphics "canvas." The components may be created by the user using known graphic development software (e.g., Flash™) or selected from pre-existing files or libraries (e.g., Flash™ files). Such components may include, for example, user interface elements (e.g., sliders, buttons, checkboxes), charts, maps, moving characters or objects, "special effects," etc. The nature and appearance of the components is limited only by the imagination of the user and the capabilities of the graphics development software or files available to the user. After the canvas of components is created, the user may selectively associate components with input and output data that are utilized in spreadsheet applications or other similar software programs. In one preferred embodiment, this process of associating is performed by selecting a graphic component from the canvas, inputting a desired range of values that the graphic component is to represent, and selecting one or more data cells in a preexisting spreadsheet file with which the graphic component is to be associated.

In a preferred embodiment, after graphic components have been associated with input and output data cells of a spreadsheet file as described above, the user may arrange the selected graphic components to create an interactive graphics simulation (referred to herein as a "control panel") of the input and output data values. The control panel includes the graphic components associated with the data cells which can, as described above, include a variety of components, including user interface elements (such as sliders, buttons, and checkboxes), charts, maps, etc. The underlying simulation is generated based on spreadsheet cells selected by the user during the control panel creation process. When cells are selected, any underlying algorithms or mathematical formulas associating input data values with output data values are automatically imported into the control panel file. Thus, the algorithms and mathematical relationships originally created using the spreadsheet program are automatically replicated in the control panel file as a mathematical model of the relationship between selected input and output cells.

In a further embodiment, the control panel file, created as described above, can be processed or executed by a standalone program (e.g., a Flash Player™) which is independent of the spreadsheet application used to generate it.

DETAILED DESCRIPTION OF THE PREFERRED EMBODIMENTS

Figure 1:
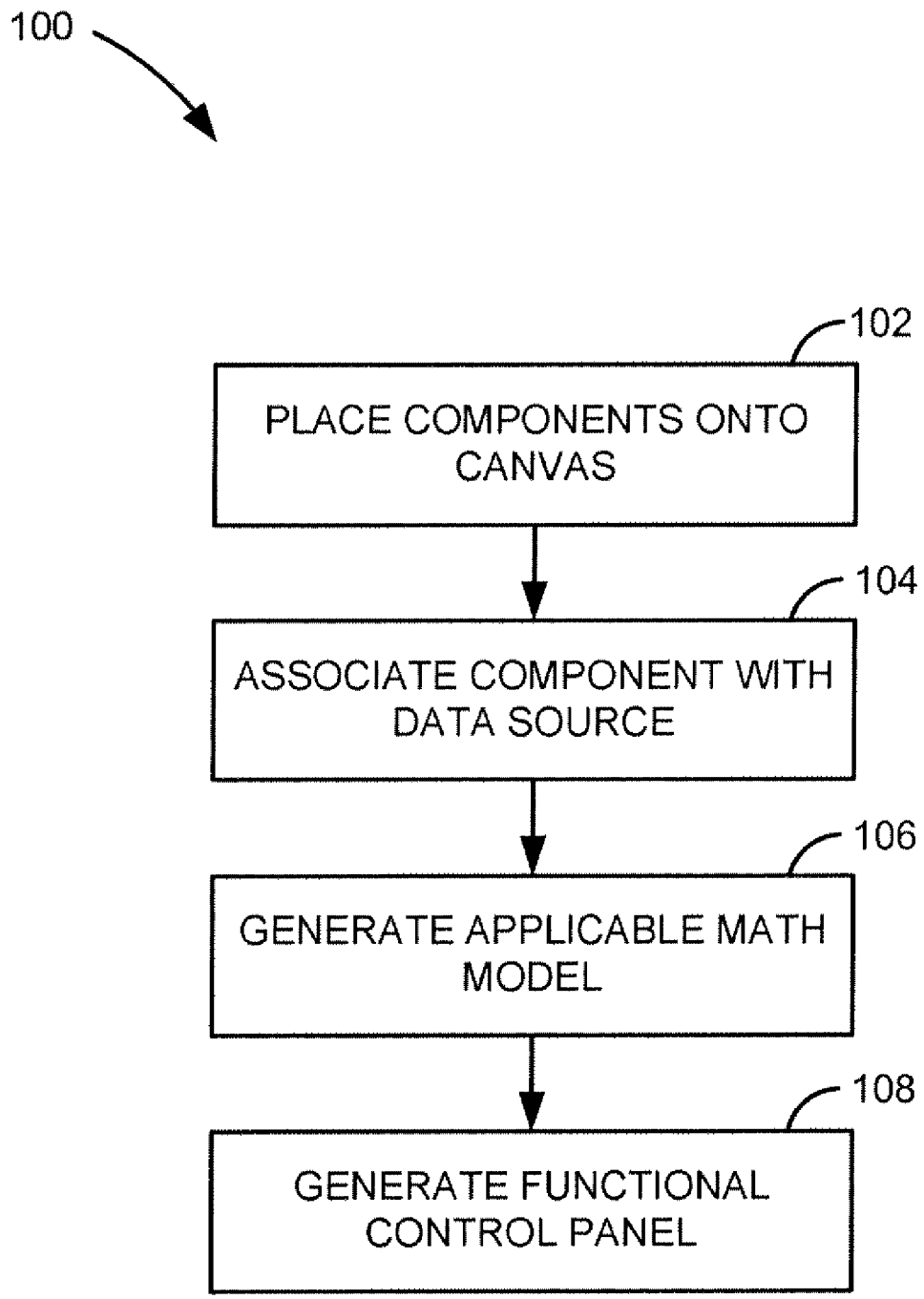
FIG. 1 illustrates a flow chart diagram oaf process for creating a control panel, in accordance with one embodiment of the invention.

Various preferred embodiments of the invention are described in detail below with reference to the figures, wherein like elements are referenced with like numerals throughout. Although the preferred embodiments discussed below are described in the context of associating Flash-generated graphic components with cells in a spreadsheet program (e.g., Microsoft Excel®), it is readily understood by those of ordinary skill in the art that graphic components, created or selected using any type of graphics program may be associated with input and output data parameters utilized in other types of business application software programs, in accordance with the spirit and scope of the present invention. However, for purposes of describing the invention, an exemplary method and system for creating a control panel that interactively associates Flash™ graphic components with cells of a spreadsheet program is disclosed herein, in accordance with a preferred embodiment of the invention.

The control panels generated in accordance with the present invention enable users to interactively visualize relationships between input and output cells on a spreadsheet. Data cells on a spreadsheet usually contain a mix of numeric values, and formulas that depend either directly or indirectly on those numeric values. In one embodiment of the invention, a user may select two sets of cells of interest (input cells and output cells) and construct a control panel that illustrates how modifying data values contained in the input cells will affect the data values contained in the output cells. The input cells are bound to graphic components that allow the input values or some characteristic of the input data to be modified. The output cells are bound to graphic components that display output data values or some characteristic of the output data (e.g., bar graphs, line plots, maps, pie charts, etc.). In a preferred embodiment, the resulting control panel illustrates how values or characteristics of components assigned to output cells change in real time in response to user interaction with the input cell components. As used herein, the term "value" collectively refers to any numeric value, or any characteristic or trait that is observable by a human.

For example, a spreadsheet may have input cells A1 and B1 which contain the values 6 and 2 respectively. The spreadsheet may further include a first output cell A2 containing values in accordance with the formula A1*B1, a second output cell B2 containing values in accordance with the formula A1/B1, a third output cell A3 containing values in accordance with the formula A2+B2 and a fourth output cell B3 containing values in accordance with the formula A2-B2. This spreadsheet implicitly sets up a model where A1 and B1 are input cells which determine the values of output cells A2 and B2 which in turn determine the values of output cells A3 and B3. Cells A2 and B2 are also "intermediate cells" that govern the relationship between input cells A1 and B1, on the one hand, and output cells A3 and B3 on the other. Changing values of parameters contained in input cells A1 and B1 affect the values of parameters contained in output cells A3 and B3. Thus, a control panel can be constructed based on this spreadsheet that would allow a user to interactively visualize the underlying calculations and relationships between these cells.

In one preferred embodiment, a control panel is assembled in the following manner:

Component Layout: The user selects components from a component library and places them on a canvas area that visually represents the control panel.

Binding Components to Spreadsheet Cells: The user assigns a data source to each of the components on the canvas. The data source consists of a spreadsheet range.

Extraction of applicable math model: The program automatically extracts the formulas from the spreadsheet that are necessary to reproduce the mathematical model implicit in the selected cells.

Generation of functional control panel: The program generates a Flash movie that contains the control panel where values of components assigned to output cells change in real time in response to user interaction with input cell components.

FIG. 1 illustrates a flow chart diagram of a process 100 for creating a control panel in accordance with a preferred embodiment of the invention. The process 100 includes a first step 102 at which desired graphic components are placed onto a canvas. As mentioned above, these graphic components may be selected from pre-existing graphics libraries or pre-created by the user using known graphics and animation tools and techniques. At step 104, each component that is placed on the canvas is associated with a data source (e.g., a spreadsheet cell). As would be readily apparent to one of ordinary skill in the art, steps 102 and 104 may be performed successively in an iterative fashion for each successive component placed onto the canvas or, alternatively, in a "lump sum" fashion such that all desired components are placed onto the canvas (step 102) before proceeding to the step of associating each component with a data source (step 104). Further detailed descriptions of performing steps 102 and 104, in accordance with a preferred embodiment of the invention, are provided below with reference to FIGS. 2-4.

After the desired number of components have been placed onto the canvas and associated to respective data sources, the process 100 proceeds to step 106 wherein an applicable mathematical model is generated that simulates the mathematical relationships between the data sources assigned to each component. Further details of performing step 106, in accordance with a preferred embodiment, are provided below.

Finally, at step 108, the process 100 generates a functional control panel that comprises a simulation program modeling the behavior and relationships between selected data sources. As the values of data parameters contained in selected input data sources are changed or manipulated, the simulation model dynamically modifies components corresponding to output data sources having parameter values dependant upon the selected input data sources. In a preferred embodiment, the control panel is a standalone file or program that can be exported and executed externally and independently of the underlying spreadsheet application program used to create it. A more detailed discussion of performing step 108 in accordance with a preferred embodiment of the invention is provided below.

Component Layout

In one preferred embodiment, when the program starts up, the user is presented with a blank canvas, and a palette of visual components which can be placed on the canvas and customized. This canvas area forms the basic shell of the application. The application is similar to the Document/View architecture and functionality found in most mainstream windows applications (e.g., Microsoft Windows®). In the present invention, the Document consists oaf data structure that represents the control panel being assembled. This representation is capable of being saved to and loaded from a file. The View consists of a visual representation of the canvas and graphic components that ultimately make up the control panel.

The View consists of a depiction of the canvas area where the control panel is assembled. The canvas area includes basic layout functionality. For example, a user can select a component and then draw a rectangular region on the canvas that the component is going to occupy. Once drawn the region can be moved or scaled freely using techniques well-known in the art. Additional functionality allows components to be aligned in a variety of ways such that the representation of the control panel can be created to look as close to the final control panel as possible.

Figure 2:
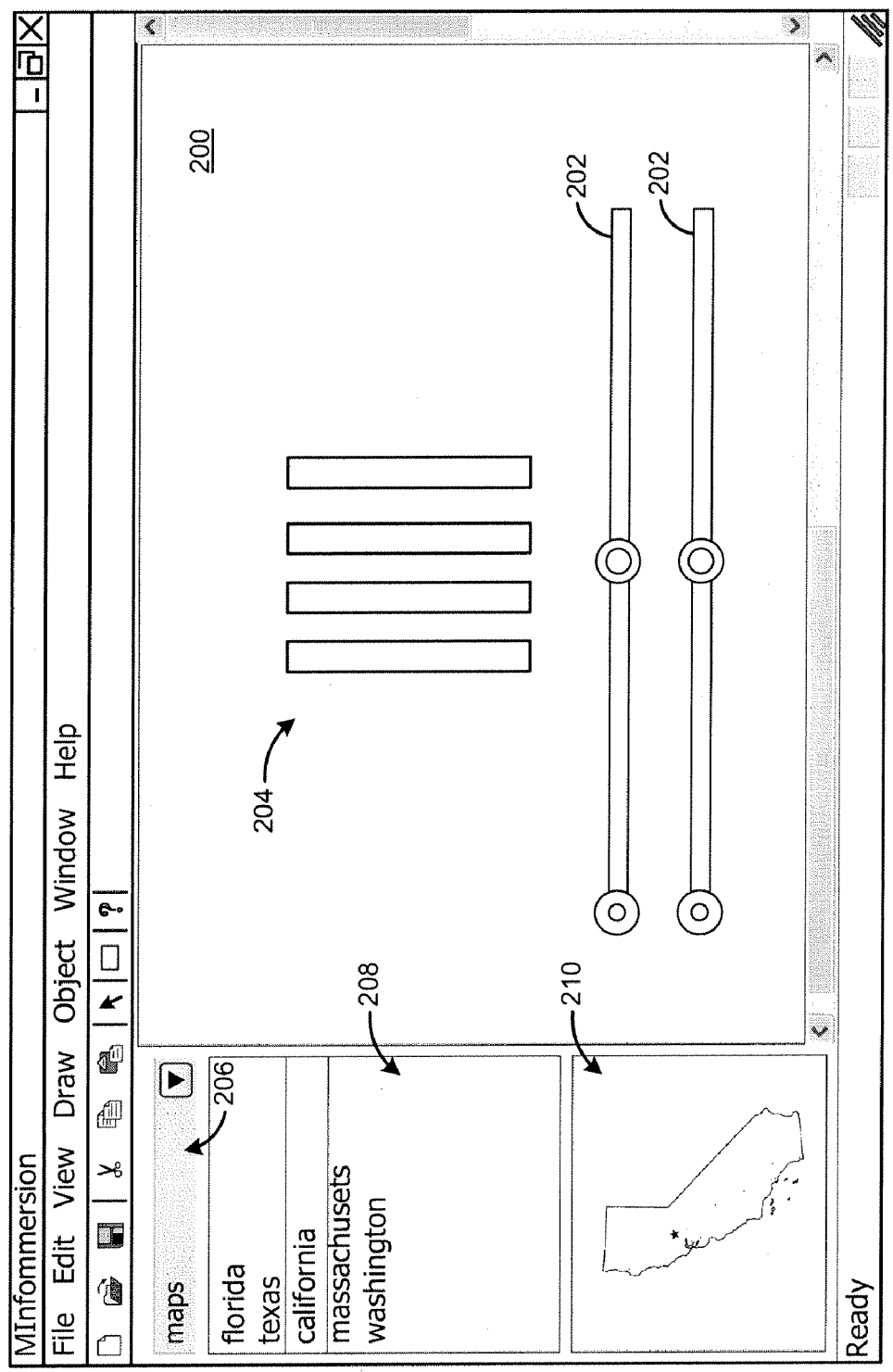
FIG. 2 illustrates an exemplary computer screen display of a canvas layout tool, in accordance with one embodiment of the invention.

FIG. 2 illustrates an exemplary computer screen display of a canvas layout tool in accordance with one preferred embodiment of the invention. As shown in FIG. 2, a user has placed two slider components 202 and one bar chart component 204 onto the canvas 200. In the case of the example mentioned above having input cells A1 and B1 and output cells A2, B2, A3 and B3, a user could select a slider component 202, for example, from a pre-created component library and create two instances of it on the canvas, each representing one of the input cells A1 and B1. The user could then select the bar chart component 204 having four bars, for example, and create one instance of it on the canvas to represent output cells A2, B2, A3 and B3.

As further illustrated in FIG. 2, the canvas layout tool also includes a "combo box" window 206 and a "list box" window 208 for displaying different component categories (e.g., maps) and components belonging to a selected category, respectively. A preview window 210 shows a preview of a currently selected component.

In a preferred embodiment, the canvas layout tool illustrated in FIG. 2 is created as a single document interface (SDI) application, using the Microsoft Foundation Class (MFC) library and an MFC application wizard. Standard MFC classes may be used to implement the canvas and associated controls. The MFC library is a well-known publicly available resource used by programmers to assist them in the creation of application software for performing specified functions. The MFC library provides programming documentation including a reference to MFC classes, global functions, global variables, and macros that make up the library.

After components 202 and 204 are placed onto the canvas 200, the control panel presented on the canvas only contains a visual representation. At this point, there is no data associated with the components and hence, no functionality associated with the control panel.

Binding Components to Spreadsheet Cells

Once components have been placed on the canvas, as described above, they have to be associated with cells on an existing spreadsheet. Most spreadsheet programs such as Microsoft Excel®, offer an application program interface (API) for interacting with the application and allowing other applications to communicate with it. In the case of Microsoft Excel® the API is offered through a component object model (COM) framework. COM is a well-known and widely used component software model offered by Microsoft® that provides a set of integrated services, a wide choice of easy-to-use tools, and a large set of available applications. COM consists oaf well-defined and freely available specification, as well as a reference implementation, which has been widely tested and adopted worldwide as a de-facto standard.

Figure 3:
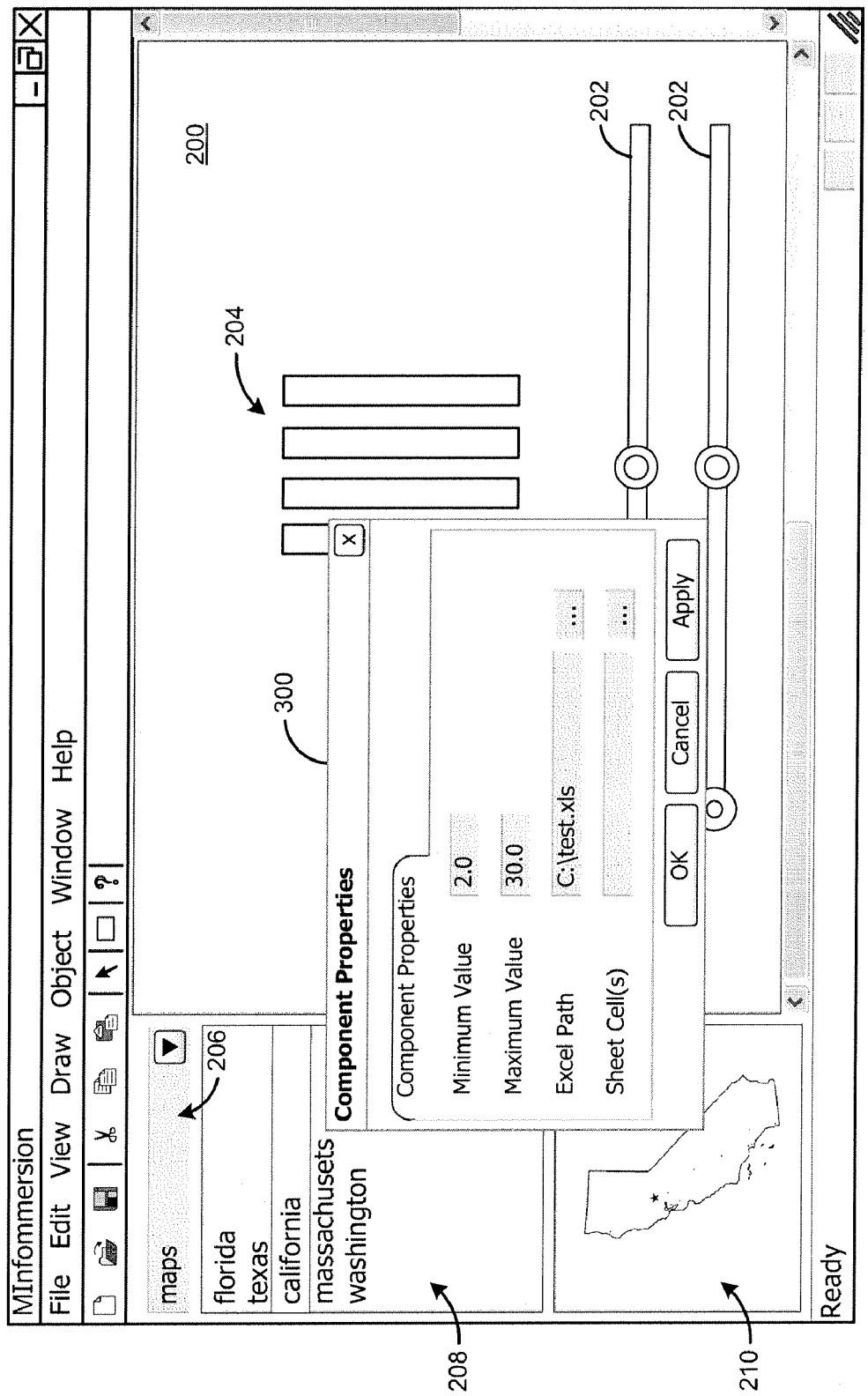
FIG. 3 illustrates an exemplary computer screen display of a canvas layout tool as it is used to associate components with a data source and specify component properties, in accordance with one embodiment of the invention.

FIG. 3 illustrates an exemplary computer screen display of the canvas layout tool of FIG. 2 as it is used to associate selected components with data cells oaf spreadsheet application program, in accordance with one embodiment of the invention. As shown in FIG. 3, a component properties dialog box 300 is displayed when a user right clicks on a component, for example, and selects a "properties" option on a popup menu (not shown). The dialog box 300 allows the user to specify minimum and maximum values for the component and also allows the data source to be specified as well. As shown in FIG. 3, the user can select a data source by selecting a valid spreadsheet file (e.g., a file called C:\test.xls) and one or more cells (i.e., a range of cells) within the corresponding spreadsheet to associate the one or more cells to a selected component. This functionality, as illustrated in FIG. 3, can be implemented in a straightforward manner using standard MFC controls.

Figure 4:
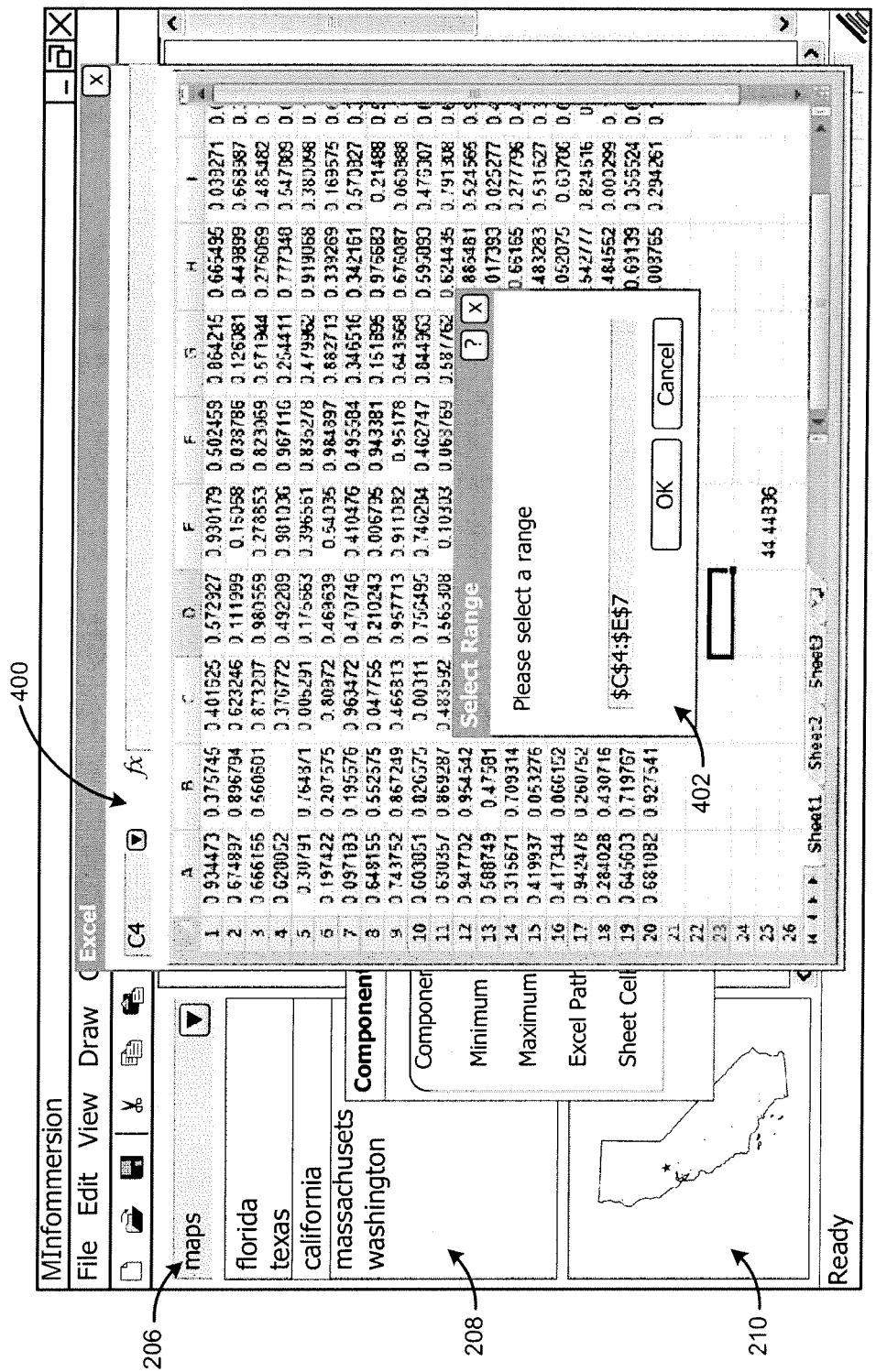
FIG. 4 illustrates an exemplary computer screen display of a canvas layout tool as it is used to select a range of values for a selected component after it has been associated with a selected spreadsheet file, in accordance with one embodiment of the invention.

FIG. 4 illustrates an exemplary computer screen display of the canvas layout tool of FIG. 2 as it is used to select a range of cells within a selected spreadsheet, in accordance with one embodiment of the invention. After the user has selected a valid spreadsheet file as described above in connection with FIG. 3, in one embodiment, the layout tool provides an instance of the spreadsheet corresponding to the selected spreadsheet file. As shown in FIG. 4, a spreadsheet 400 is displayed in the main window of the layout tool for the user's review. A "Select Range" dialog box 402 is also provided to the user so that the user can input the range of cells he or she desires to associate with a specific graphic component.

Any range of cells may be selected for a particular component, depending on the user's desired design of the control panel. Typically, an input component is assigned to one input cell. However, it is not necessary to limit an input component to only one cell. Two or more input cells can be associated with a component in which case the component would simultaneous control the values of those cells. Similarly, an output component such as bar chart component 204 may be associated with four output cells, each corresponding to one of the four bars of the bar chart component 204. Various association arrangements between cells and components would be readily apparent to those of ordinary skill in the art. Additionally, it is understood by those of ordinary skill in the art that cells or ranges of cells may be selected using a graphic pointing device (e.g., a mouse) in addition to or instead of the dialog box 402 illustrated in FIG. 4. In the specific embodiment of the tool shown in FIG. 4, this functionality is accomplished through Microsoft's Automation technology (built on top of COM) which allows other applications to spawn and control Excel® in a programmatic way. In a preferred embodiment, the select range function is accomplished using the Input Box Excel function which is well-known in the art and available through the Excel® Automation API.

Extraction of Applicable Math Model

The process of associating components with cells involves not only associating components to data values found in those cells but also associating the components to underlying mathematical formulas or models that determine the data values of those cells. By creating this association, the resulting control panel constitutes an interactive visual simulation model which can dynamically illustrate how modifying the values present in input cells affect the values found in output cells, or vice-versa. Thus, in the example provided above, after a user has associated each of the two sliders 202 with cells A1 and B1 respectively, and associated the bar chart component 204 with the output cells A2, B2, A3 and B3, the resulting control panel prototype will allow the user to visually observe how altering the values of input cells A1 and B1 (by manipulating the sliders) will affect the values in cells A2, B2, A3 and B3, as dynamically illustrated by the bar chart component 204.

Even the simplest Excel® spreadsheets, for example, contain formulas that exist within its cells. These formulas can reference other cells, which may in turn contain additional formulas and so on. Typically, users will be interested in showing how values in output cells X, Y, and Z will change in response to changing values of input cells A, B, C. In most cases, the output cells contain formulas that either directly or indirectly reference the input cells. For example, cell X may contain a formula that directly references cells A and B. Cell Y, however, may contain a formula which references cell P. Cell P in turn contains a formula that references B and C. In this case, even though cell P was not explicitly selected by the user, its formula is necessary in order to compute X, Y, and Z, given input cells A, B, and C. Cell P is referred to as an intermediate cell. Thus, the formulas contained in output cells and intermediate cells form a mathematical model of the relationship between the input cells A, B and C, on one hand, and the output cells X, Y and Z on the other. As can be appreciated by those of ordinary skill in the art, these formulas can range in complexity to complex mathematical algorithms to simple binomial logic relationships.

In a preferred embodiment of the invention, a Calculation Engine is provided that takes the necessary formulas (including intermediate cell formulas) from a spreadsheet and generates an internal data structure that can be used to re-create the minimal calculations necessary for selected cells within the spreadsheet. Only the necessary formulas are extracted. In one preferred embodiment, the Calculation Engine includes code that parses the content of formulas using a flex/bison generated parser. Flex and Bison are widely used and freely available software tools used to generate parsers that can parse data according to a specified grammar. These programs, as well as the documentation explaining how to generate parsers in accordance with the present invention are available, for example, among other sources, at the following websites: http://www.gnu.orglsofwarelbisonlbison.html and http://www.gnu.orglsoftware/flex/flex.html.

Continuing with the example above, in which cells A1 and B1 are input cells, A2, and B2 are intermediate cells, and cells A3 and B3 are output cells. The Calculation engine generates an internal data structure that consists of a set of expression trees which represents each of the formulas in the intermediate and output cells. Exemplary code for the Calculation Engine main loop is provided in Appendix A attached hereto. The functions "Generate" and "Gen" form the heart of the Calculation Engine by traversing all applicable cells given a set of input and output cells and generating expression trees for each formula that resides in a particular cell.

The functions "Generate" and "Gen" call upon further source code files or modules to parse the individual formulas and convert them into standard expression trees, using a parser that follows standard rules for spreadsheet formulas, including standard mathematical operator precedence and functions. These functions are called and controlled by the Calculation Engine main loop to perform the process of associating components with data cells and extracting applicable mathematical formulas as described above, in accordance with a preferred embodiment of the invention. It is appreciated that those of ordinary skill in the art can create or write the necessary source code, without undue experimentation, for performing the functions called by "Generate" and "Gen," in accordance with the description and resource specifications provided above. In one preferred embodiment, exemplary source code for performing these functions called by the Calculation Engine main loop is provided by functions Get Cell Contents, BisonGrammar and Parse Formula Data Structure in Appendix A attached hereto.

In accordance with a preferred embodiment, the Bison-Grammer function defines the syntax and semantic rules for mathematical formulas contained in an Excel® spreadsheet, for example. The BisonGrammer code is executed by a Bison Program to generate the ParseFormula function called by the Calculation Engine main loop. The operation and functionality of the Bison Program is well-known in the art and described in detail, for example, in Levine et al., *Lex &yacc*, O'Reilly & Associates, Inc.© 1990, 1992, the entirety of which is incorporated by reference herein. The ParseFormulaDataStructure function defines the data structures used by ParseFormula to generate expression trees that in turn define the relationships between input and output data cells.

Generation of Functional Control Panel

In accordance with a preferred embodiment of the invention, the ability to dynamically generate the control panel as a Flash™ file is based on knowledge of the Flash™ file format that is provided by Macromedia, Inc. This file format is well-known in the art and provided by the Macromedia Flash™ file format software development kit (SDK), freely available from Macromedia, Inc. and downloadable from Macromedia's website (www.macromedia.com). Other equivalent or compatible SDK's such as those provided or disclosed at www.virtuascape.net/swfsource.html or http://freemovie.sourceforge.net/, for example, may also be utilized in accordance with the present invention. The process of generating the control panel can be described in two pieces, the generation of visual components such as sliders and charts that correspond to the graphic components placed onto the canvas, as described above, and the generation of the code that represents the mathematical simulation that the control panel represents.

The generation of the visual components involves creating the appropriate Flash™ file format data structures that when written out, define the look and behavior of the graphic components and also place and arrange the appropriate visual components in the same way that they appear on the canvas. The creation of such graphic data structures is a straightforward process to those of ordinary skill in the art who are familiar with the Macromedia SDK, or other equivalent SDK's, and the specification of the Flash™ file format.

In a preferred embodiment, the generation of the applicable math calculations involves taking the set of expression trees generated in the previous step and generating equivalent actionscript code in accordance with Macromedia's Flash 5 file format. Actionscript is the scripting language that is a part of the Flash 5 file format. Some additional code is further generated that executes the actionscript in response to user interaction with the control paneL For those familiar with the Flash 5 file format SDK and the actionscript language, it is a straightforward process to generate the equivalent actionscript code and the code for executing the actionscript. Exemplary source code for generating actionscript, in accordance with a preferred embodiment of the invention, is provided by a function called GenerateActionscript in Appendix A attached hereto.

Figure 5:
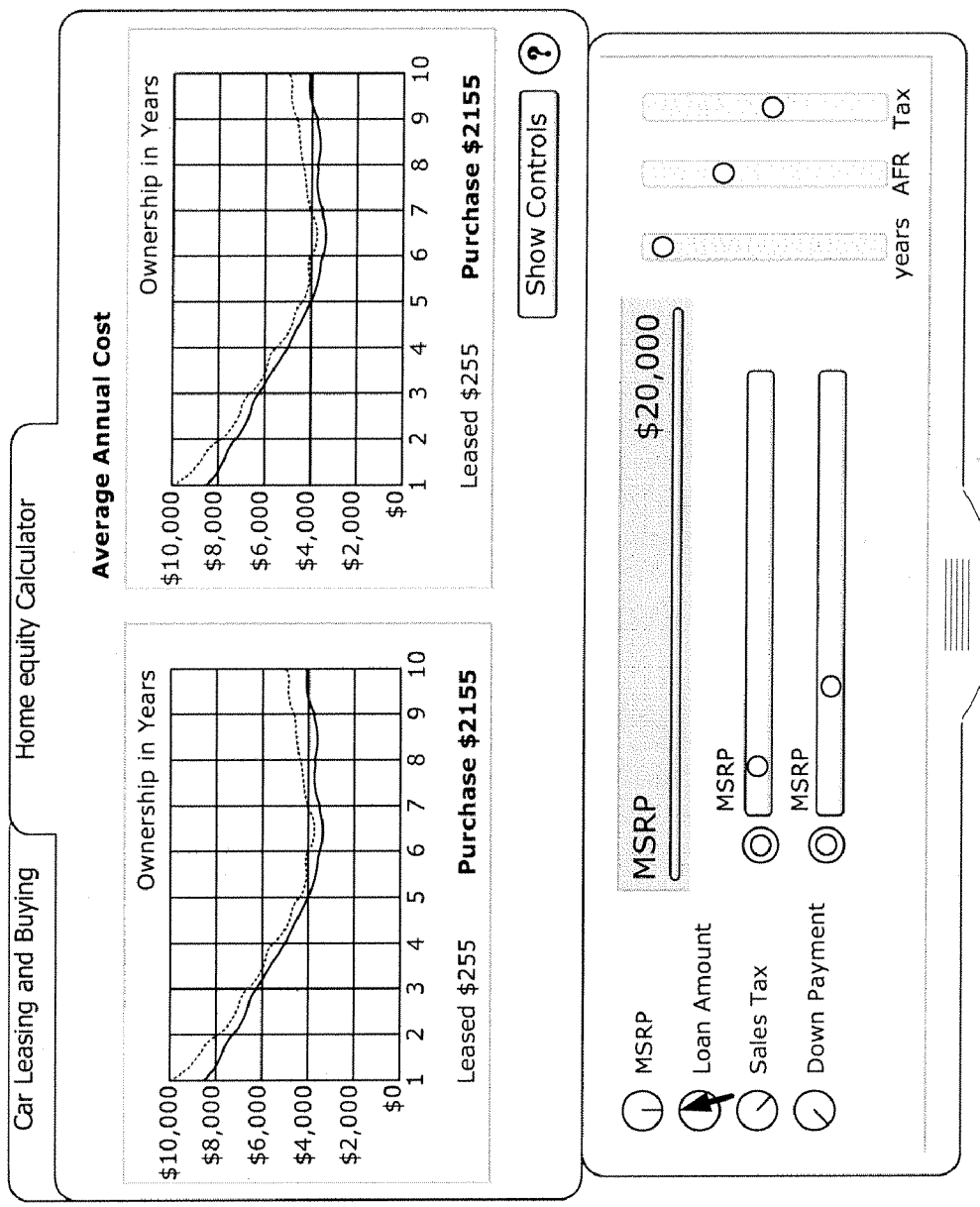
FIG. 5 illustrates an exemplary control panel created in accordance with one embodiment of the invention.

After a control panel is created as described above, it may be exported such that it is no longer dependent in any way on either the tool that created it or the spreadsheet that was used in creating it. FIG. 5 illustrates a computer screen display of an exemplary control panel that may be created in accordance with the present invention. As shown in FIG. 5, various graphic input and output components are provided by the control panel. By manipulating or adjusting input components (e.g., sliders and rotating knobs), output components will dynamically change in accordance with the mathematical model extracted from the spreadsheet used to create the control panel. In this way, a user is provided with a dynamic, creative and visually stimulating representation of input and output data and their relational behavior. In a preferred embodiment, this control panel may be saved as a separate file that is executable by a standalone program (e.g., Flash Player™) that is independent of the layout tool or spreadsheet used to create it.

One of ordinary skill in the art will appreciate that the above descriptions of the preferred embodiments are exemplary only and that the invention may be practiced with modifications or variations of the techniques disclosed above. Those of ordinary skill in the art will know, or be able to ascertain using no more than routine experimentation, many equivalents to the specific embodiments of the invention described herein. For example, many types of graphical representations of input and output data other than the aforementioned "sliders," "bar graphs," etc., may be implemented. Any desired graphical aids that may be contemplated by a designer, whether they be two-dimensional, three dimensional, static or dynamic, animations or inanimate graphics, may be utilized in accordance with the present invention.

It is also understood that one of ordinary skill in the art would be able to create or write alternative source code to the exemplary code provided in Appendix A attached hereto, without undue experimentation, in order to create the layout tools and carry out the above-described functions, in accordance with the method and system of the present invention. It is further understood that some or all of these tools and functions may be implemented as purely executable software, or as hardware components (e.g. ASICs, programmable logic devices or arrays, etc.), or as firmware, or as any combination of these implementations. Such implementations are collectively referred to herein and below as "modules." Additionally, as readily understood by those of ordinary skill in the art, modules that are implemented as pure software may be stored as computerexecutable instructions in one or more computer-readable mediums (e.g., CD ROMs, floppy disks, hard drives, RAMs, ROMs, flash memory, etc.). In summary, various modifications of the preferred embodiments described above can be implemented by those of ordinary skill in the art, without undue experimentation. These various modifications are contemplated to be within the spirit and scope of the invention as set forth in the claims below.

APPENDIX A

Pseudo-Code for Calculation Engine Main Loop

```
Function Generate( ) {
    Foreach (Output in Outputs) {
        cellContents = GetCellContents(output)
        expressionTree = Gen(output,cellContents)
        addOutputCell(output,expressionTree);
    }
}
Function Gen (CellAddress, CellContents) {
    ExpressionTree = ParseFormula(CellContents)
    Foreach Variable in ExpressionTree {
        cellContentsX = GetCellContents(Variable)
        expressionTreeX = Gen(Variable,cellContentsX)
        if (expressionTreeX contains a value and not a formula) {
            if (Variable matches an input value) {
                addInputCell(Variable,expressionTreeX)
            }
        } else if (expressionTreeX contains a formula) {
            addIntermediateCell(Variable,expressionTreeX)
        }
    }
    return ExpressionTree
}
#Function GetCellContents
    char *xlModel::GetCellContents(const char *cellId) {
    VARIANT cell;
    cell.bstrVal = SysAllocStringLen(0,strlen(cellId));
    cell.vt = VT_BSTR;
    MultiByteToWideChar(CP_ACP,0,cellId,-1,cell.bstrVal)strlen(cellId));
    Range currRange;
    currRange= pXL->GetRange(cell,cell);
    VARIANT ret;
    ret = currRange.GetFormula( );
    char *buf = new char[wcslen(ret.bstrVal)+1];
```

-continued

```
        WideCharToMultiByte(CP_ACP,0,ret.bstrVal,-1, buf,64,0,0);
        SysFreeString(cell.bstrVal);
        return buf;
#Function BisonGrammar
%{
#include <iostream.h>
#include "fonnulaParser.h"
#include "calc/node.h"
#include "calc/function.h"
#include "util/output.h"
extern int formulaerror(const char* s);
extern int formulalex( );
%}
/*
* Declare the type of values in the grammar
*/
%union
{
    float float_type;
    char *identifier_type;
    calcNode *node_type;
    calcFunction *func_type;
}
/*
* Token types: These are returned by the lexer
*/
%token <float_type>         TOK_NUMBER
%token <identifier_type>    TOK IDENTIFIER
%left '-' '+'
%left '*' '/'
%nonassoc UMINUS
/*
* These are production names:
*/
%type <node_type>     atom
%type <func_type>     args
%type <node_type>     exp
%type <node_type>     formula
    %%
/*
* Production starts here
*/
formula:        '=' exp     { formulaParser::Result = $2; }
        | atom { formulaParser::Result = $1; }
        ;
exp: atom       { $$ = $1; }
|exp '+' exp    { $$ = new calcFunction($l,$3,FUNC_ADD); }
|exp '-' exp    { $$ = new calcFunction($l,$3,FUNC_SUB); }
|exp '*' exp    { $$ = new calcFunction($l,$3,FUNC_MUL); }
|exp '/' exp    {$$ = new calcFunction($l,$3,FUNC_DIV); }
|'-' exp %prec UMINUS {$$ = new calcFunction(new calcValue(-1),$2,FUNC_MUL);}
|'('exp')'      {$$ =$2}
|TOK_IDENTIFIER '('args')'        {
        int func;
        if (func = FuncTable::IsFunction($1)) {$3->SetFunction(func);
        $$ = $3;
        } else {
        $$ = $3;
        } free($1);
        }
        ;
args: exp       { $$ = new calcFunction($1); }
|args ',' exp   { $1->AddChild($3); }
        ;
atom: TOK NUMBER       { $$ = new calcValue($1); }
| TOK_IDENTIFIER {
        calcVar *var = new calcVar($1);
        formulaParser::AddVar(var);
        $$ = var;
        }
| TOK_IDENTIFIER ':' TOK_IDENTIFIER
        calcRange *range = new calcRange($1,$3);
        formulaParser::AddRange(range);
        $$ = range;
        }
;
%%
/*programs */
/*
*
```

-continued

```
*/
extern "C"
{
int
formulawrap( )
{
    return 1;
}
}
}
/*
 * Report an error situation discovered in a production
 *
 * This does not do anything since we report all error situations through
 *idl_global->err( ) operations
 */
Int
formulaerror(const char *s)
{
    cerr << "Syntax error: " << s << endl;
    return 0;
}
#Function ParseFormulaDataStructure
#ifudefFORMULA_TREE
#define FORMULA_TREE
#include "util/node.h"
#include <stdio.h>
#include <list>
class swfDefineFunction;
class fString;
// need to implement fileIO for these classes...
class calcNode : public Node {
    friend class calcNodeFactory;
public:
    // rtti
    enum { CALC_VAL=1,CALC_VAR=2,CALC_FUNC=3, CALC_RANGE=4 };
    virtual int GetType( ) = 0;
    virtual void WriteActionScript(swfDefineFunction *f) = 0; // constructs series of
action script statements that represent formula
    virtual void Save(FILE *f)=0;
    virtual void Load(FILE *f)=0;
};
class calcValue: public calcNode {
public:
    calcValue( ) { Val=0; }
    calcValue(float val) { Val=val; }
    int GetTypeO( ){ return CALC_VAL; }
    float Val;
    void WriteActionScript(swfDefineFunction *f);
    void Save(FILE *f);
    void Load(FILE *f);
};
class calcVar : public calcNode {
public:
    calcVar( ) {Var =0; }
    calcVar(char *var) { Var=var; }
    ~calcVar( ) { free(Var); } // was created with strdup
    int GetType( ) { return CALC_VAR; }
    char *Var;
    void WriteActionScript(swfDefineFunction *f);
    void Save(FILE *f);
    void Load(FILE *f);
};
class calcRange : public calcNode {
public:
    calcRange( ) { A=0; B=0; }
    calcRange(char *a, char *b);
    ~calcRange( );
    int GetType( ) (return CALC_RANGE; }
    char *A,*B;
    void WriteActionScript(swfDefineFunction *f);
    void Save(FILE *f);
    void Load(FILE *f);
};
#endif
#Function GenerateActionscript
#include "calc/function.h"
#include "swf/controltags.h"
#include "swt/action.h"
#include <assert.h>
#include <string.h>
```

```
int FuncTable::NumEntries = 0;
FuncTableEntry FuncTable::Table[MAX_FUNCTIONS];
void FuncTable::initTable( ) {
    if(NumEntries)
        return;
    AddFunc("EXP");
    AddFunc("POWER");
    AddFunc("SUM");
}
void FuncTable::AddFunc(const char *name) {
    assert(NumEntries!=MAX_FUNCTIONS);
    Table[NumEntries++].Name = name;
}
int FuncTable::IsFunction(const char *name) {
    for (int i=0; i<NumEntries; i++) {
        if(!strcmp(name,Table[i].Name))
            return i+NUM_OPS;
    }
    return 0; // not a function
};
void calcFunction::WriteActionScript(swfDefineFunction *f) {
    for (int i=0; i<NumChildren; i++) {
        ((calcNode*)GetChild(i))->WriteActionScript(f);
    }
    switch (Function) {
    case FUNC ADD:
        f->AddStatement(new fActionAdd( ));
        break;
    case FUNC SUB:
        f->AddStatement(new fActionSubtract( ));
        break;
    case FUNC MUL:
        f->AddStatement(new fActiOIlL\1:ultiply( ));
        break;
    case FUNC DIV:
        f->AddStatement(new fActionDivide( ));
        break;
    case FUNC EXP:
        f->AddStatement(new fActionPushInt(I));
        f->AddStatement(new fActionPush(new fString((U8*)"Math")));
        f->AddStatement(new fActionGetVariable( ));
        f->AddStatement(new fActionPush(new fString((U8*)"exp")));
        f->AddStatement(new fActionCallMethod( ));
        break;
    case FUNC POW:
        f->AddStatement(new fActionPushInt(2));
        f->AddStatement(new fActionPush(new fString((U8*)"Math")));
        f->AddStatement(new fActionGetVariable( ));
        f->AddStatement(new fActionPush(new fString((U8*)"pow")));
        f->AddStatement(new fActionCallMethod( ));
        break;
    case FUNC SUM:
        for (int i=0; i<NumChildren; i++) {
            if ( ((calcNode*)GetChild(i))->GetType( ) ==
calcNode::CALC_RANGE) {
                calcRange *range = (calcRange*)GetChild(i);
                for (int j=1; j< range->GetNumChildren( ); j++) {
                    f->AddStatement(new fAction Add( ));
                }
            } else if (i!=0) {
                f->AddStatement(new fAction Add( ));
            }
        }
        break;
    }
}
void calcFunction::Save(FILE *f) {
    fwrite(&Function,sizeof(Function),1,f);
}
void calcFunction::Load(FILE *f) {
    fread(&Function,sizeof(Functin),1,f);
}
```

What is claimed is:

1. A method of creating a graphic representation of data contained in a file generated using a software application program, the method being implemented by one or more data processors and comprising:
   selecting, by at least one data processor, from a source independent of the software application program at least one first graphic component to represent a first data source contained within the file and at least one second graphic component to represent a second data source contained within the file;
   associating, by at least one data processor, the at least one first graphic component with the first data source, wherein the first data source contains at least one first data value and the at least one first graphic component is adjustable so as to change the at least one first data value;
   associating, by at least one data procesor, the at least one second graphic component with the second data source, wherein the second data source contains at least one second data value and the at least one second graphic component is configured to illustrate a change in the at least one second data value when the at least one first data value is changed;
   generating, by at least one data processor, a mathematical model representative of a mathematical relationship between the at least one first data source and the at least one second data source; and
   generating, by at least one data processor, a control panel comprising the at least one first graphic component, the at least one second graphic component and the mathematical model such that, when the control panel is executed, the at least one second graphic component illustrates a change in the at least one second data value when the at least one first data value is changed by adjusting the at least one first graphic component, based on the mathematical model.

2. The method of claim 1 further comprising:
   prompting, by at least one data processor, a user to assign the first graphic component to represent the first data source; and
   prompting, by at least one data processor, the user to assign the second graphic component to represent the second data source.

3. The method of claim 1, wherein generating the control panel comprises:
   generating, by at least one data processor, visual components that correspond to the at least one first graphic component and the at least one second graphic component; and
   generating, by at least one data processor, code to represent the at least one first graphic component, the at least one second graphic component and the mathematical model.

4. The method of claim 1, wherein generating the control panel comprises:
   generating, by at least one data processor, a first visual component that corresponds to the first graphic component;
   generating, by at least one data processor, a second visual component that corresponds to the second graphic component; and
   generating, by at least one data processor, code to represent the first graphic component, the second graphic component and the mathematical model.

5. The method of claim 4, wherein generating the visual component comprises:
   creating, by at least one data processor, file format data structures for the first visual component;
   wherein the file format data structures define the look and behavior of the first visual component.

6. The method of claim 4, wherein generating code comprises:
   generating, by at least one data processor, a first set of code from a set of expression trees;
   wherein the expression trees are characterized by the mathematical model.

7. The method of claim 6, wherein generating code further comprises:
   generating, by at least one data processor, a second set of code configured for executing the first set of code in response to input from a user.

8. The method of claim 1 wherein:
   the file represents a spreadsheet; and
   generating the mathematical model includes generating, by at least one data processor, at least one mathematical formula from at least one cell of the spreadsheet.

9. The method of claim 1, wherein:
   the file represents a spreadsheet; and
   generating the mathematical model includes deriving, by at least one data processor, at least one mathematical formula from at least one cell of the spreadsheet.

10. The method of claim 1 wherein generating the mathematical model includes deriving, by at least one data processor, at least one mathematical formula from the file.

11. The method of claim 1 wherein generating the control panel includes the control panel, and the method further comprises:
    generating, by at least one data processor, a first data structure that defines the place and arrangement of the first graphical component;
    generating, by at least one data processor, a second data structure that defines the place and arrangement of the second graphical component.

12. The method of claim 1, wherein generating the control panel includes the control panel, and the method further comprises:
    generating, by at least one data processor, a first data structure that defines the behavior of the first graphical component;
    generating, by at least one data processor, a second data structure that defines the behavior of the second graphical component.

13. A method of creating a graphic representation of data contained in a spreadsheet file generated using spreadsheet program, the method being implemented by one or more data processors and comprising:
    selecting, by at least one data processor, from a source independent of the spreadsheet program at least one first graphic component to represent a first set of cells contained within the spreadsheet file and at least one second graphic component to represent a second set of cells contained within the spreadsheet file;
    associating, by at least one data processor, the at least one first graphic component with the first set of cells, wherein the first set of cells contains at least one first data value and the at least one first graphic component is adjustable so as to change the at least one first data value;
    associating, by at least one data processor, the at least one second graphic component with the second set of cells, wherein the set of cells contains at least one second data value and the at least one second graphic component is configured to illustrate a change in the at least one second data value when the at least one first data value is changed;

generating, by at least one data processor, a mathematical model representative of a mathematical relationship between the at least one first set of cells and the at least one second set of cells; and generating, by at least one data processor, a control panel comprising the at least one first graphic component, the at least one second graphic component and the mathematical model such that, when the control panel is executed, the at least one second graphic component illustrates a change in the at least one second data value when the at least one first data value is changed by adjusting the at least one first graphic component, based on the mathematical model.

14. The method of claim 13 further comprising:

prompting, by at least one data processor, a user to assign the first graphic component to represent the first set of cells; and prompting, by at least one data processor, the user to assign the second graphic component to represent the second set of cells.

15. The method of claim 13, wherein generating the control panel comprises:

generating, by at least one data processor, a first visual component that corresponds to the first graphic component;

generating, by at least one data processor, a second visual component that corresponds to the second graphic component; and generating, by at least one data processor, code to represent the first graphic component, the second graphic component and the mathematical model.

16. The method of claim 13, wherein generating the control panel comprises:

generating, by at least one data processor, a first visual component that corresponds to the first graphic component;

generating, by at least one data processor, a second visual component that corresponds to the second graphic component; and generating, by at least one data processor, code to represent the first graphic component, the second graphic component and the mathematical model.

17. The method of claim 16, wherein generating the visual component comprises:

creating, by at least one data processor, file format data structures for the first visual component;

wherein the file format data structures define the look, and behavior of the first visual component.

18. The method of claim 16, wherein generating code comprises:

generating, by at least one data processor, a first set of code from a set of expression trees;

wherein the expression trees are characterized by the mathematical model.

19. The method of claim 18, wherein generating code further comprises:

generating, by at least one data processor, a second set of code configured for executing the first set of code in response to input from a user.

20. The method of claim 13, wherein generating the mathematical model includes deriving, by at least one data processor, at least one mathematical formula from at least one cell of the spreadsheet.

* * * * *